United States Patent
Tanaka et al.

(10) Patent No.: US 11,572,416 B2
(45) Date of Patent: Feb. 7, 2023

(54) CELLULOSE RESIN, MOLDING MATERIAL, MOLDED BODY, AND METHOD FOR PRODUCING CELLULOSE RESIN

(71) Applicant: NEC CORPORATION, Tokyo (JP)

(72) Inventors: Shukichi Tanaka, Tokyo (JP); Midori Shimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/617,571

(22) PCT Filed: May 31, 2018

(86) PCT No.: PCT/JP2018/020987
§ 371 (c)(1),
(2) Date: Nov. 27, 2019

(87) PCT Pub. No.: WO2018/221663
PCT Pub. Date: Dec. 6, 2018

(65) Prior Publication Data
US 2020/0181289 A1    Jun. 11, 2020

(30) Foreign Application Priority Data

Jun. 1, 2017 (JP) .............................. JP2017-109250
Mar. 27, 2018 (JP) .............................. JP2018-059565

(51) Int. Cl.
*C08B 3/16* (2006.01)
*C08B 3/26* (2006.01)

(52) U.S. Cl.
CPC . *C08B 3/16* (2013.01); *C08B 3/26* (2013.01)

(58) Field of Classification Search
CPC ... C08L 1/08; C08L 67/04; C08B 3/26; C08B 3/16
See application file for complete search history.

(56) References Cited

U.S. PATENT DOCUMENTS

| | | | |
|---|---|---|---|
| 5,750,677 A | 5/1998 | Edgar et al. | |
| 9,382,335 B2 * | 7/2016 | Toyama | C08B 3/20 |
| 2015/0141639 A1 | 5/2015 | Toyama et al. | |
| 2015/0368442 A1 * | 12/2015 | Soyama | C08L 1/08 |
| | | | 524/41 |
| 2016/0251452 A1 | 9/2016 | Toyama et al. | |
| 2017/0260294 A1 * | 9/2017 | Toyama | C08L 1/14 |

FOREIGN PATENT DOCUMENTS

| | | |
|---|---|---|
| JP | 10-511728 A | 11/1998 |
| JP | 2002-265639 A | 9/2002 |
| JP | 2007-217838 A | 8/2007 |
| JP | 2008-127535 A | 6/2008 |
| JP | 2008-248208 A | 10/2008 |
| JP | 2010-121121 A | 6/2010 |
| WO | 2011/043279 A1 | 4/2011 |
| WO | 2011/043280 A1 | 4/2011 |
| WO | 2013/180278 A1 | 12/2013 |
| WO | 2015/060122 A1 | 4/2015 |
| WO | 2015/068818 A1 | 5/2015 |
| WO | 2015/162787 A1 | 10/2015 |
| WO | 2016/067662 A1 | 5/2016 |
| WO | 2017/061190 A1 | 4/2017 |
| WO | 2017/115634 A1 | 7/2017 |

OTHER PUBLICATIONS

Miroslav Janicek, et al., "Termal stability of surface-esterified cellulose and its composite with polyolefinic matrix", Cellulose, 2013, pp. 2745-2755, vol. 20, No. 6.
International Search Report for PCT/JP2018/020987 dated Aug. 21, 2018 (PCT/ISA/210).

* cited by examiner

*Primary Examiner* — Leigh C Maier
*Assistant Examiner* — Everett White
(74) *Attorney, Agent, or Firm* — Sughrue Mion, PLLC

(57) ABSTRACT

A cellulose resin wherein a hydrogen atom of a hydroxy group of cellulose is substituted with a long-chain component which is a linear saturated aliphatic acyl group having 14 or more carbon atoms and a short-chain component which is an acyl group (propionyl group) having 3 carbon atoms, the degree of substitution with the long-chain component ($DS_{Lo}$) and the degree of substitution with the short-chain component ($DS_{Sh}$) satisfy the following conditional expressions (1) and (2):

$$DS_{Lo} + DS_{Sh} \geq 2.1 \tag{1}$$

$$4 \leq DS_{Sh}/DS_{Lo} \leq 12 \tag{2},$$

the Izod impact strength is 5.0 kJ/m² or more, and the MFR (melt flow rate at 200° C. and under a load of 5 kg) is 10 g/10 min or more.

26 Claims, No Drawings

CELLULOSE RESIN, MOLDING MATERIAL, MOLDED BODY, AND METHOD FOR PRODUCING CELLULOSE RESIN

CROSS REFERENCE TO RELATED APPLICATIONS

This application is a National Stage of International Application No. PCT/JP2018/020987 filed May 31, 2018, claiming priority based on Japanese Patent Application No. 2017-109250 filed Jun. 1, 2017 and Japanese Patent Application No. 2018-059565 filed Mar. 27, 2018, the entire contents of which are incorporated herein by reference.

TECHNICAL FIELD

The present invention relates to a cellulose resin, a molding material, a molded body, and a method for producing the cellulose resin.

BACKGROUND ART

Bioplastics made from vegetable law materials can contribute to countermeasures against petroleum depletion and global warming, and has been started being used in jeneral products such as packaging, containers and fibers but also in durable products such as electronic equipment and automobiles.

However, conventional bioplastics, such as polylactic acid, polyhydroxyalkanates, modified starch, are all made of starch-based materials, i.e., edible parts. Therefore, in view of concerns about food shortages in the future, the development of new bioplastics using non-edible parts as raw materials is required.

As a raw material of the non-edible part, cellulose, which is a main component of wood and vegetation, is typical, and various bioplastics using the cellulose have been developed and commercialized.

However, the process of chemically modifying cellulose into a resin suitable for molding is complicated and labor-intensive, and the production energy is high, so that the production cost of cellulose resin is high. Furthermore, the mechanical characteristics of the resins produced are not sufficient.

Cellulose is produced as pulp by chemically separating lignin and hemicellulose from wood or the like, with the help of a chemical agent. Alternatively, since cotton is almost made of cellulose, it can be used as it is. Such a cellulose, which is a polymer formed by polymerization of β-glucose, has a strong intermolecular force due to hydrogen bonds because it has many hydroxy groups. Therefore, it is hard and brittle, does not have thermoplasticity, and is low in solvent solubility except for a special solvent.

Various studies have been conducted to modify such a cellulose.

As a method of modifying cellulose, a method of replacing a hydrogen atom of a hydroxy group of cellulose with a short-chain acyl group such as an acetyl group is known. According to this method, since the number of hydroxy groups can be reduced, the intermolecular force of cellulose can be reduced. Furthermore, it has been investigated to introduce a long-chain organic group having a higher carbon number in addition to a short-chain acyl group such as an acetyl group to produce a cellulose derivative having a good thermoplastic property.

For example, Patent Literature 1 describes a cellulose acylate film produced from a solution obtained by dissolving a cellulose acylate in which the substitution degree of hydroxy groups of the cellulose satisfies predetermined conditions, and a polycarboxylic acid which has 22 or less carbon atoms and a carboxyl group having an acid dissociation index of 4.4 or less, in an organic solvent. The literature describes a case where cellulose triacetate was used as the cellulose acylate. Since such a film can be easily removed from a support after producing by casting and drying, the productivity thereof is excellent.

Additionally, Patent Literature 2 describes a cellulose derivative produced by substituting at least a part of hydrogen atoms of hydroxy groups of a cellulose with a short-chain acyl group (for example, an aliphatic acyl group having 2 to 4 carbon atoms) and a long-chain acyl group (for example, an aliphatic acyl group having 5 to 20 carbon atoms), and that the cellulose derivative has satisfactory thermoplasticity, strength and fracture elongation and is suitable for molding process.

Patent Literature 3 describes a process for producing a cellulose derivative, including the steps of introducing a long-chain organic group having 5 or more carbon atoms and a short-chain organic group having 4 or less carbon atoms to a cellulose by reacting them in a solid-liquid heterogeneous system, and conducting solid-liquid separation to obtain the cellulose derivative.

Patent Literature 4 describes a cellulose derivative having cardanol introduced therein, and that the cellulose derivative was improved in thermoplasticity, and mechanical characteristics.

Patent Literature 5 describes a cellulose derivative having cardanol and abietic acid introduced therein, and that the cellulose derivative was improved in thermoplasticity, and mechanical characteristics.

Patent Literature 6 describes a process for producing a cellulose derivative including a first step of reacting a cellulose with a long-chain reactant for introducing a long-chain organic group having 5 or more carbon atoms in a solid-liquid heterogeneous system to form a cellulose derivative having the long-chain organic group introduced therein and remaining hydroxy groups which are a part of the hydroxy groups of the cellulose, in a swollen state, and performing solid-liquid separation to obtain an intermediate cellulose derivative; and a second step of reacting the intermediate cellulose derivative with a short-chain reactant for introducing a short-chain organic group having 4 or less carbon atoms to form a final cellulose derivative having the short-chain organic group introduced therein.

Patent Document 7 describes a cellulose derivative in which a long-chain organic group having 5 or more carbon atoms and a short-chain organic group having 4 or less carbon atoms are introduced by utilizing a hydroxy group of cellulose, the cellulose derivative has a crystal structure derived from a cellulose derivative portion to which the short-chain organic group is bonded, and the average number of hydroxy groups per glucose unit is 1.0 or less.

CITATION LIST

Patent Literature

Patent Literature 1: JP2002-265639A
Patent Literature 2: JP2010-121121A
Patent Literature 3: WO2013/180278
Patent Literature 4: WO2011/043279

Patent Literature 5: WO2011/043280
Patent Literature 6: WO2015/060122
Patent Literature 7: WO2016/067662

SUMMARY OF INVENTION

Technical Problem

An object of the present invention is to provide a cellulose resin having excellent mechanical characteristics and thermoplasticity, and a method for producing the cellulose resin.

Solution to Problem

According to an aspect of the present invention, there is provided a cellulose resin formed by substituting hydrogen atoms of hydroxy groups of a cellulose with a long-chain component being a linear saturated aliphatic acyl group having 14 or more carbon atoms and a short-chain component being an acyl group (propionyl group) having 3 carbon atoms, wherein a degree of substitution with the long-chain component ($DS_{Lo}$) and a degree of substitution with the short-chain component ($DS_{Sh}$) satisfy the following conditional expressions (1) and (2):

$$DS_{Lo}+DS_{Sh} \geq 2.1 \tag{1}$$

$$4 \leq DS_{Sh}/DS_{Lo} \leq 12 \tag{2},$$

Izod impact strength is 5.0 kJ/m² or more, and an MFR (melt flow rate at 200□ and under a load of 5 kg) is 10 g/10 min or more.

According to another aspect of the present invention, there is provided a molding material comprising the above-mentioned cellulose resin.

According to another aspect of the present invention, there is provided a molded body formed by using the above-mentioned molding material.

According to another aspect of the present invention, there is provided a method for producing the cellulose resin according to any one of claims 1 to 4, comprising:

acylating hydroxy groups of a cellulose constituting a pulp by reacting the pulp having a polymerization degree of 300 to 700 and dispersed in an organic solvent with propionyl chloride, and a long-chain reactant being an acid chloride of a long-chain fatty acid and comprising the long-chain component, in the presence of the acid trapping component and under warming; and separating an acylated cellulose obtained in the acylating from the organic solvent.

Advantageous Effects of Invention

According to an exemplary embodiment of the present invention, a cellulose resin having excellent mechanical characteristics and thermoplasticity and a method for producing the cellulose resin can be provided.

DESCRIPTION OF EMBODIMENTS

A cellulose resin according to an exemplary embodiment of the present invention is a cellulose derivative formed by substituting hydrogen atoms of hydroxy groups of a cellulose with a long-chain component which is a linear saturated aliphatic acyl group having 14 or more carbon atoms and a short-chain component which is an acyl group having 3 carbon atoms (propionyl group).

It is preferable that the degree of substitution with the long-chain component ($DS_{Lo}$) and the degree of substitution with the short-chain component ($DS_{Sh}$) satisfy the following conditional expressions (1) and (2):

$$DS_{Lo}+DS_{Sh} \geq 2.1 \tag{1}$$

$$4 \leq DS_{Sh}/DS_{Lo} \leq 12 \tag{2}$$

The $DS_{Lo}+DS_{Sh}$ preferably in the range of 2.1 to 2.6. The $DS_{Lo}$ is particularly preferably in the range of 0.3 to 0.5, and more preferably in the range of 0.35 to 0.45. The $DS_{Sh}$ is particularly preferably in the range of 1.9 to 2.3, and more preferably in the range of 1.9 to 2.2.

In the cellulose resin according to the exemplary embodiment of the present invention, it is preferable that the long-chain component and the short-chain component are introduced into a cellulose having a degree of polymerization (DP) in the range of 300 to 700 by using a hydroxy group of the cellulose. The degree of polymerization (DP) of the cellulose (prior to the introduction of the long-chain component and the short-chain component) was calculated by measuring the limiting viscosity [η] in accordance with the JIS P8215 and calculating the limiting viscosity according to the following equation.

$$[\eta]=1.67 \times DP^{0.71}$$

Such a cellulose resin can have excellent mechanical characteristics and thermoplasticity. As mechanical characteristics, for example, a cellulose resin having excellent impact resistance can be obtained.

By introducing the long-chain component, thermoplasticity and water resistance can be enhanced, and by having the long-chain component and the short-chain component in a specific ratio, mechanical characteristics such as bending strength, elastic modulus and impact resistance can be enhanced. The carbon number of the long-chain component is particularly preferably in the range of 16 to 20.

In the cellulose-based resin according to an exemplary embodiment of the present invention, from the viewpoints of flowability, water resistance, impact resistance, and the like, it is preferable that the average number of hydroxyl groups per glucose unit (hydroxy group remaining degree, $DS_{OH}$) is 0.9 or less.

The cellulose resin according to an exemplary embodiment of the present invention preferably has an Izod impact strength of 5.0 kJ/m² or more, and an MFR (melt flow rate at 200° C. and under a load of 5 kg) of 10 g/10 min or more. The Izod impact strength is a notched Izod impact strength measured according to JIS K7110. The MFR is preferably 10 g/10 min or more, more preferably 30 g/10 min or more, and more preferably 50 g/10 min or more from the viewpoint of preventing the flowability from becoming too low and hindering molding. The upper limit of the MFR is not particularly limited, but generally can be set to 200 g/10 min or less, set to 180 g/10 min or less, and set to 150 g/10 min or less. When the MFR is too large, the molecular weight of the resin tends to be low, and accordingly, the impact resistance tends to be low.

In a method for producing a cellulose resin according to an exemplary embodiment of the present invention, it is preferable that the organic solvent is a solvent providing a liquid holding rate by the cellulose of 90% by volume or more. The acid trapping component preferably includes triethylamine or pyridine. The reaction temperature of the acylation step is preferably 50 to 100° C. The amount of the organic solvent is preferably 10 to 50 times as large as the dry mass of the pulp. In addition, the method may further include, after the above acylation step, a step of adding an alkaline aqueous solution and maintaining at 25 to 75° C. for 1 to 5 hours.

(Cellulose)

Cellulose is a straight-chain polymer obtained by polymerizing β-D-glucose (β-D-glucopyranose) molecules represented by the following formula (1) via β (1→4) glycoside bond. Each of glucose units constituting cellulose has three hydroxy groups (where n represents a natural number). In the exemplary embodiment, using these hydroxy groups, the short-chain organic group and long-chain organic group can be introduced into the cellulose.

[Formula 1]

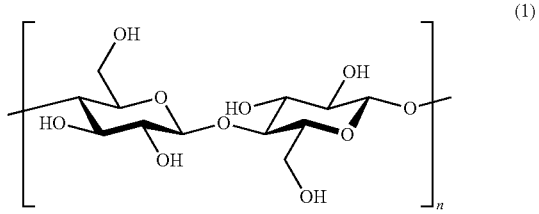

(1)

Cellulose is a main component of plants and can be obtained by a separation treatment for removing other components such as lignin from plants. Other than those thus obtained, cotton (for example, cotton linters) having a high cellulose content and pulp (for example, wood pulp) can be used directly or after they are purified. As the shape, size and form of the cellulose or a derivative thereof to be used as a raw material, a powder form cellulose or a derivative thereof having an appropriate particle size and particle shape is preferably used in view of reactivity, solid-liquid separation and handling. For example, a fibrous or powdery cellulose or a derivative thereof having a diameter of 1 to 100 μm (preferably 10 to 50 μm) and a length of 10 μm to 100 mm (preferably 100 μm to 10 mm) can be used.

The polymerization degree of cellulose is preferably in the range of 300 to 700, more preferably 350 to 650, and still more preferably 400 to 600, as the degree of glucose polymerization (average degree of polymerization). If the polymerization degree is too low, the impact resistance of the produced resin may not be sufficient in some cases. Conversely, if the polymerization degree is too high, the flowability of the produced resin becomes too low, interfering with molding in some cases.

Cellulose may be mixed with a similar structure material such as chitin, chitosan, hemicellulose, xylan, glucomannan, curdlan, and the like. When cellulose is mixed with the similar structure material, the amount of the material relative to the total amount of mixture is preferably 30% by mass or less preferably 20% by mass or less and further preferably 10% by mass or less.

The description in the above is directed to cellulose; however, the present invention is applicable to analogs of the cellulose, such as general non-edible polysaccharides, i.e., chitin, chitosan, hemicellulose, xylan, glucomannan and curdlan.

(Long-Chain Component)

The cellulose resin according to an exemplary embodiment of the present invention is a resin formed by introducing a long-chain component as mentioned above in addition to a short-chain component as mentioned above by use of a hydroxy group of a cellulose.

Such a long-chain component can be introduced by reacting a hydroxy group of a cellulose with a long-chain reactant. The long-chain component corresponds to an acyl group introduced in place of the hydrogen atom of a hydroxy group of a cellulose. A long-chain organic group of the long-chain component and a pyranose ring of a cellulose can be bound via an ester bond. The acyl group introduced is a linear saturated aliphatic acyl group having 14 or more carbon atoms. A linear saturated aliphatic acyl group having 14 to 30 carbon atoms is mentioned; a linear saturated aliphatic acyl group having 14 to 22 carbon atoms is preferable; and groups (tetradecanoyl group, hexadecanoyl group, octadecanoyl group, icosanoyl group, docosanoyl group) obtained by removing OH from a carboxyl group of myristic acid, palmitic acid, stearic acid, arachidic acid and behenic acid, are more preferable.

The long-chain reactant is a compound having at least one functional group capable of reacting with a hydroxy group of a cellulose; for example, a compound having a carboxyl group, a carboxylic acid halide group or a carboxylic acid anhydride group can be used.

As the long-chain reactant, for example, a long-chain carboxylic acid having 14 or more carbon atoms and an acid halide or acid anhydride of the long-chain carboxylic acid can be used. The saturation degrees of these carboxylic acids or carboxylic acid derivatives are desirably as high as possible; a linear saturated fatty acid, an acid halide or anhydride thereof is preferable. Examples of the long-chain carboxylic acid include linear saturated fatty acids such as myristic acid, pentadecylic acid, palmitic acid, margaric acid, stearic acid, arachidic acid, behenic acid, lignoceric acid, cerotic acid, montanic acid and melissic acid. Myristic acid, palmitic acid, stearic acid, arachidic acid and behenic acid are preferable. Further as the long-chain carboxylic acid, a carboxylic acid obtained from natural products is preferable, in view of environmental harmony.

The long-chain component has preferably 14 or more carbon atoms and particularly preferably 16 or more carbon atoms. In view of reaction efficiency in introducing a long-chain component, the long-chain component has preferably 48 or less carbon atoms, more preferably 36 or less carbon atoms and particularly preferably 24 or less carbon atoms. A single type of a long-chain component may be contained alone, or two types or more of long-chain components may be contained.

The average number of long-chain components introduced per glucose unit of a cellulose ($DS_{LO}$) (long-chain component introduction ratio), in other words, the average number of hydroxy groups substituted with a long-chain component (a linear saturated aliphatic acyl group having 14 or more carbon atoms) per glucose unit (hydroxy group substitution degree), preferably satisfy the conditions represented by the above expressions (1) and (2). $DS_{LO}$ can be set to fall within the range of, for example, 0.2 to 0.6, in accordance with the structure and introduction amount of a short-chain component, the structure of a long-chain component, physical properties required for a desired product and the production efficiency. In order to obtain a more sufficient introduction effect of a long-chain component, $DS_{LO}$ is preferably 0.2 or more, more preferably 0.3 or more and further preferably 0.35 or more. In view of production efficiency and durability (e.g., strength, heat resistance), $DS_{LO}$ is preferably 0.6 or less, more preferably 0.5 or less and further preferably 0.45 or less.

The properties of a cellulose or a derivative thereof can be improved by introducing a long-chain component as mentioned above into the cellulose or a derivative thereof. More specifically, water resistance, thermoplasticity and mechanical characteristics can be improved.

(Short-Chain Component)

The cellulose resin according to an exemplary embodiment of the present invention is a resin formed by introducing a short-chain component as mentioned above in addition to a long-chain component as mentioned above, using hydroxy groups of a cellulose. As the short-chain component, a propionyl group is preferable.

Such a short-chain component can be introduced by reacting a hydroxy group of a cellulose with a short-chain reactant. The short-chain component corresponds to an acyl group moiety introduced in place of a hydrogen atom of a hydroxy group of the cellulose. The short-chain organic group (propyl group) of a short-chain component and the pyranose ring of the cellulose can be bound via an ester bond.

The short-chain reactant is a compound having at least one functional group capable of reacting with a hydroxy group of a cellulose. Examples thereof include compounds having a carboxyl group, a carboxylic acid halide group and a carboxylic acid anhydride group. Specific examples thereof include an aliphatic monocarboxylic acid, an acid halide or acid anhydride thereof.

It is more preferable that the short-chain component has 3 carbon atoms, and the hydrogen atom of a hydroxy group of the cellulose is replaced with an acyl group (propionyl group) having 3 carbon atoms.

The average number of short-chain components introduced per glucose unit of a cellulose ($DS_{Sh}$) (short-chain component introduction ratio), in other words, the average number of hydroxy groups substituted with a short-chain component (propionyl group) per glucose unit (the substitution degree of hydroxy groups), preferably satisfy the conditions represented by the above expressions (1) and (2) (note that, $3 \geq DS_{Lo} + DS_{Sh}$). $DS_{Sh}$ can be set to fall within the range of 1.7 to 2.8. In order to obtain a more sufficient effect of introducing a short-chain component, $DS_{Sh}$ is preferably 1.7 or more. Particularly, in view of, e.g., water resistance and flowability, $DS_{Sh}$ is preferably 1.9 or more and more preferably 2.0. In order to obtain the sufficient effect of a long-chain component in addition to the effect of introducing a short-chain component, $DS_{Sh}$ is preferably 2.6 or less, more preferably 2.3 or less and further preferably 2.2 or less.

By introducing the aforementioned short-chain component into a cellulose or a derivative thereof, the intermolecular force (intermolecular bond) of the cellulose can be reduced; and mechanical characteristics such as elastic modulus, chemical resistance and physical properties such as surface hardness can be enhanced.

The ratio ($DS_{Sh}/DS_{Lo}$) of the introduction ratio of the long-chain component to the introduction ratio of the short-chain component is preferably 4 or more and 12 or less. If the ratio is less than 4, the material tends to become too flexible and accordingly its strength and heat resistance tend to decrease. On the contrary, if the ratio exceeds 12, thermoplasticity becomes insufficient, with the result that it becomes unsuitable for molding applications. In these respects, $DS_{Sh}/DS_{Lo}$ is more preferably 4.5 or more, more preferably 10 or less, and still more preferably 7.5 or less.

The sum of the ratio of the long-chain component and the ratio of the short-chain component ($DS_{Lo} + DS_{Sh}$) is preferably 2.1 or more, more preferably 2.2 or more, more preferably 2.25 or more, from the viewpoint of obtaining adequate introduction effects of the long-chain component and the short-chain component, and more preferably 2.6 or less, more preferably 2.55 or less, from the viewpoint of mechanical characteristics and the like.

(Residual Amount of Hydroxy Groups in Cellulose Resin)

As the residual amount of hydroxy groups increases, the maximum strength and heat resistance of the cellulose resin tend to increase; whereas water absorbability tends to increase. In contrast, as the conversion rate (degree of substitution) of hydroxy groups increases, water absorbability tends to decrease, plasticity and breaking strain tend to increase; whereas, maximum strength and heat resistance tend to decrease. In consideration of these tendencies etc., the conversion rate of hydroxy groups can be appropriately set.

The average number of the remaining hydroxy group per glucose unit (hydroxy group remaining degree, $DS_{OH}$) of a final cellulose resin can be set to fall within the range of 0 to 0.9 (note that, $DS_{Lo} + DS_{Sh} + DS_{OH} = 3$). If $DS_{Lo} + DS_{Sh}$ is in the range of 2.1 to 2.6, $DS_{OH}$ can be set in the range of 0.4 to 0.9. In view of mechanical characteristics such as maximum strength and durability such as heat resistance, a hydroxy group may remain. For example, the hydroxy group remaining degree can be set at 0.01 or more and further 0.1 or more. Particularly, in view of flowability, the hydroxy group remaining degree of a final cellulose resin is preferably 0.1 or more and more preferably 0.2 or more. In view of, e.g., water resistance in addition to flowability, the hydroxy group remaining degree is preferably 0.9 or less. Further in view of, e.g., impact resistance, the hydroxy group remaining degree is preferably 0.6 or less and more preferably 0.5 or less.

(Activation of Cellulose)

Before the reaction step for introducing a long-chain component and a short-chain component into a cellulose, an activation treatment (pretreatment step) can be performed in order to increase the reactivity of the cellulose. As the activation treatment, an activation treatment which is routinely performed before acetylation of a cellulose can be applied.

In the activation treatment, a cellulose is swollen by bringing the cellulose into contact with a solvent, for example, by a method of spraying an activation solvent having affinity for a cellulose to the cellulose or by a method (soaking method) of soaking a cellulose in an activation solvent. Owing to the treatment, a reactant easily penetrates between cellulose molecular chains (if a solvent and a catalyst are used, a reactant easily penetrates together with these), with the result that the reactivity of the cellulose improves. Herein, examples of the activation solvent include water; carboxylic acids such as acetic acid, propionic acid, butyric acid, valeric acid, caproic acid, enanthic acid, caprylic acid, pelargonic acid and stearic acid; alcohols such as methanol, ethanol, propanol and isopropanol; nitrogen-containing compounds such as dimethylformamide, formamide, ethanolamine and pyridine; and sulfoxide compounds such as dimethylsulfoxide. These can be used in combination of two or more types. Particularly preferably, water, acetic acid, pyridine and dimethylsulfoxide can be used.

A cellulose can be activated by putting it in a long-chain fatty acid. If the melting point of the long-chain fatty acid is room temperature or more, a cellulose can be heated up to the melting point or more.

The use amount of activation solvent relative to a cellulose (100 parts by mass) can be set to be, for example, 10 parts by mass or more, preferably 20 parts by mass or more and more preferably 30 parts by mass or more. If a cellulose is soaked in an activation solvent, the use amount of activation solvent relative to the cellulose in term of mass, can be set to be, for example, the same or more, preferably 5 times or more and more preferably 10 times or more. In view of load for removing an activation solvent after the pretreatment and cost reduction of materials, the use amount of activation solvent is preferably 300 times or less, more preferably 100 times or less and further preferably 50 times or less.

The temperature of the activation treatment can be appropriately set within the range of, for example, 0 to 100° C. In view of the efficiency of activation and reduction of energy cost, the temperature is preferably 10 to 40° C. and more preferably 15 to 35° C.

When a cellulose is put in a melted long-chain fatty acid, the cellulose can be heated up to melting point or more of the long-chain fatty acid.

The time for the activation treatment can be appropriately set within the range of, for example, 0.1 hour to 72 hours. In order to perform sufficient activation and reduce the treatment time, the time is preferably 0.1 hour to 24 hours and more preferably 0.5 hours to 3 hours.

After the activation treatment, an excessive activation solvent can be removed by a solid-liquid separation method such as suction filtration, filter press and compression.

The activation solvent contained in a cellulose can be substituted with the solvent to be used in the reaction after the activation treatment. For example, a substitution treatment can be performed in accordance with the soaking method for an activation treatment mentioned above by changing the activation solvent to the solvent to be used in the reaction.

(Method for Introducing Long-Chain Component and Short-Chain Component)

A cellulose derivative (cellulose resin) according to an exemplary embodiment can be produced in accordance with the method shown below.

A process for producing a cellulose derivative according to an exemplary embodiment includes a step of acylating hydroxy groups of a cellulose constituting pulp by reacting, in an organic solvent, the pulp dispersed in the organic solvent, a short-chain reactant (short-chain acylating agent) and a long-chain reactant (long-chain acylating agent) in the presence of an acid trapping component while warming. It is preferable that the short-chain reactant (short-chain acylating agent) and the long-chain reactant (long-chain acylating agent) are dissolved in the solvent. The acid trapping component may be also used as a solvent.

As a long-chain reactant for introducing a long-chain component in a cellulose, an acid chloride of a linear saturated fatty acid as mentioned above is preferable. A single type of a long-chain reactant may be used alone or two types or more of long-chain reactants may be used in combination. As a short-chain reactant for introducing a short-chain component in a cellulose, propionyl chloride is preferable.

The addition amounts of the long-chain reactant and short-chain reactant can be set in accordance with the degree of substitution ($DS_{Lo}$) with a long-chain component and the degree of substitution ($DS_{Sh}$) with a short-chain component in a desired cellulose derivative. If the short-chain reactant is excessively present, the binding amount of a long-chain component decreases and the degree of substitution ($DS_{Lo}$) with a long-chain component tends to decrease.

As the organic solvent, a solvent providing a liquid holding rate by cellulose: 90 vol % or more, is preferably used.

The "liquid holding rate" can be measured as follows.

Filter paper (5B, 40 mmφ, water content: about 2%) made of cotton fiber is soaked in each solvent at room temperature for one hour. The weights of the filter paper before and after soaking are measured and assigned to the following expression. In this manner, a liquid holding rate (vol %) is obtained. The weight of a sample after soaking is measured at the time when dripping of a solvent from the sample is stopped.

Liquid holding rate (vol %)=(weight after soaking−weight before soaking)/weight before soaking/specific gravity of solvent×100

Examples of a solvent providing a liquid holding rate of 90 vol % or more, include water (liquid holding rate: 145 vol %), acetic acid (liquid holding rate: 109 vol %), dioxane (liquid holding rate: 93 vol %), pyridine (liquid holding rate: 109 vol %), N-methyl pyrrolidone (liquid holding rate: 104 vol %), N,N-dimethylacetamide (liquid holding rate: 112 vol %), N,N-dimethylformamide (liquid holding rate: 129 vol %) and dimethylsulfoxide (liquid holding rate: 180 vol %).

An acid trapping component is not particularly limited as long as it is a base neutralizing an acid (e.g., hydrochloric acid, acetic acid, propionic acid) produced as a by-product. Examples thereof include alkaline metal hydroxides such as sodium hydroxide and potassium hydroxide; alkaline earth metal hydroxides such as calcium hydroxide and barium hydroxide; metal alkoxides such as sodium methoxide, sodium ethoxide; and nitrogen-containing nucleophilic compounds such as diazabicycloundecene, diazabicyclononene, triethylamine and pyridine. Of them, triethylamine and pyridine are preferable, and pyridine is particularly preferable since it can be used also as a solvent. When an acid trapping component is added independently of a solvent, it is preferable that the acid trapping component is present in a reaction system from the initiation time of a reaction. As long as an acid trapping component is present in a reaction system from the initiation time of a reaction, an acid trapping component may be added before or after addition of an acylating agent.

The addition amount of an acid trapping component relative to the total amount of a starting long-chain reactant (long-chain acylating agent) and a starting short-chain reactant (short-chain acylating agent) is preferably 0.1 to 10 equivalents and more preferably 0.5 to 5 equivalents. However, when a nitrogen-containing nucleophilic compound is used as a solvent, the addition amount of an acid trapping component is not limited the above range. If the addition amount of an acid trapping component is small, an acylation reaction efficiency decreases. In contrast, if the addition amount of an acid trapping component is large, the cellulose may be decomposed and sometimes reduced in molecular weight.

The reaction temperature in the acylation step is preferably 50 to 100° C. and more preferably 75 to 95° C. The reaction time can be set at 2 hours to 5 hours and preferably 3 hours to 4 hours. If the reaction temperature is sufficiently high, the reaction speed can be increased, with the result that an acylation reaction can be completed in a relative short time and the reaction efficiency can be increased. If the reaction temperature falls within the above range, a decrease in molecular weight by heating can be suppressed.

The amount of an organic solvent can be set to be 10 to 50 times and preferably 10 to 40 times (mass ratio) as large as the amount (dry mass) of the raw material pulp.

(Aging Step)

After the above acylation step, an aqueous alkaline solution is added, and the reaction solution is preferably held (aged) as it is while warming. The temperature during the aging is preferably 25 to 75° C. and preferably 40 to 70° C. The time for aging can be set to fall within the range of 1 to 5 hours and preferably 1 to 3 hours.

The addition amount of an aqueous alkaline solution can be set so as to correspond to 3 to 30% by mass relative to the solvent to be used, and preferably 5 to 20% by mass.

As the aqueous alkaline solution, aqueous solutions of, e.g., potassium hydroxide, sodium carbonate and sodium hydrogen carbonate are mentioned, and an aqueous solution of sodium hydroxide is preferable. The concentration of an aqueous alkaline solution is preferably 1 to 30% by mass and more preferably 5 to 20% by mass.

Owing to such an aging step, the long-chain component and the short-chain component once bound are partially hydrolyzed to come back to (homogeneous) hydroxy groups, with the result that mechanical characteristics such as strength and impact resistance can be enhanced. In addition, in the following precipitation step, a product having satisfactory properties (fine granules) can be obtained.

(Recovery Step)

A cellulose derivative (product), which is formed by introducing a long-chain component and a short-chain component, can be recovered from a reaction solution in accordance with a recovery method generally used. The recovery method is not limited; however, if a product is not dissolved in a reaction solution, a solid-liquid separation method for separating a reaction solution and a product is preferable in view of production energy. If it is difficult to separate a solid and a liquid because a product is dissolved in or compatible with a reaction solution, the reaction solution is distilled off and a product can be recovered as the residue. Alternatively, a poor solvent for a product is added to the reaction solution to precipitate the product, which may be recovered by solid-liquid separation.

When a reaction solution is distillated, it is preferable to use a short-chain reactant, a reaction solvent and a catalyst having low boiling points. The catalyst can be removed from a product with, e.g., a washing solvent without distillation. When components except a product, such as a solvent, are distilled away from a reaction solution, distillation is stopped when a product is precipitated, and then, the remaining reaction solution and the precipitated product can be subjected to solid-liquid separation to recovery the product.

As the solid-liquid separation method, e.g., filtration (natural filtration, filtration under reduced pressure, pressure filtration, centrifugal filtration and these while applying heat), spontaneous sedimentation and flotation, separation (by funnel), centrifugal separation and squeeze, are mentioned. These can be used appropriately in combination.

A product (a cellulose derivative) dissolved in a filtrate after the solid-liquid separation can be precipitated by adding a poor solvent for the product and further subjected to solid-liquid separation to recover it.

The solid content (a cellulose derivative) recovered from a reaction solution is, if necessary washed and dried by a method generally employed.

The cellulose derivative produced by this method can possess a reinforcing crystal structure due to a cellulose main-chain crystal in a thermoplastic matrix. This is derived from an unreacted part when a cellulose material is acylated. Such a cellulose main-chain crystal can be evaluated, for example, by X-ray diffractometry. At the time of evaluation, for example, a cellulose derivative can be pressed to increase the density, thereby facilitating detection of a signal.

(Other Process for Producing Cellulose Derivative)

A cellulose resin can be obtained by acylating a cellulose in a solid-liquid heterogeneous system using a mixed acid anhydride containing a long-chain component and a short-chain component, as an acylating agent. Cellulose is preferably activated. The activation treatment can be performed by a method generally used.

Acylation can be carried out in a solvent which provides a liquid holding rate of 90% or more (for example, dioxane, in an amount of, e.g., 80 to 120 times as large as the dry weight of pulp), in the presence of an acid catalyst (for example, sulfuric acid) while stirring at 45 to 65° C. for 2 to 5 hours. Thereafter, it is preferable that water is added to age the reaction solution for a few hours (for example, 1 to 3 hours) while heating (for example, 55 to 75° C.).

After completion of the reaction, a poor solvent such as a water/methanol solvent mixture, is added to allow a product dissolved in the liquid phase to sufficiently precipitate, and then, solid-liquid separation can be performed to recover a product. Thereafter, washing and drying can be made.

Acylation can be performed in a homogeneous solution system in which a cellulose and an acylating agent are homogenously dissolved in a solvent. A cellulose is preferably activated. The activation treatment can be performed by a method generally used.

As a solvent for acylation, a solvent such as N,N-dimethylacetamide, which can dissolve a cellulose, is used.

As the acylating agent, a mixed acid anhydride having a long-chain component and a short-chain component, which is produced in the same solvent as the solvent to be used in acylation, can be used.

After completion of the reaction, a poor solvent such as methanol is added to precipitate a product, which may be recovered by solid-liquid separation. Thereafter, washing and drying can be made.

(Molding Resin Composition and Additives)

The cellulose derivative according to an exemplary embodiment can provide a resin composition suitable as a molding material by adding additives in accordance with desired properties. The cellulose derivative can be compatible with an additive which is compatible with a general cellulose derivative.

To the cellulose derivative according to an exemplary embodiment, various types of additives usually used in thermoplastic resins can be applied. For example, if a plasticizer is added, thermoplasticity and breaking elongation while breaking can be more improved. Examples of such a plasticizer include phthalic esters such as dibutyl phthalate, diaryl phthalate, diethyl phthalate, dimethyl phthalate, di-2-methoxyethyl phthalate, ethyl phthalyl ethyl glycolate and methyl phthalyl ethyl glycolate; tartaric acid esters such as dibutyl tartrate; adipic acid esters such as dioctyl adipate and diisononyl adipate; polyhydric alcohol esters such as triacetin, diacetyl glycerin, tripropionitrile glycerin and glyceryl monostearate; phosphoric acid esters such as triethyl phosphate, triphenyl phosphate and tricresyl phosphate; dibasic fatty acid esters such as dibutyl adipate, dioctyl adipate, dibutyl azelate, dioctyl azelate and dioctyl sebacate; citric acid esters such as triethyl citrate, acetyltriethyl citrate and tributyl acetylcitrate; epoxylated vegetable oils such as epoxylated soybean oil and epoxylated linseed oil; castor oil and a derivative thereof; benzoic acid esters such as ethyl O-benzoyl benzoate; aliphatic dicarboxylic acid esters such as sebacate and azelate; unsaturated dicarboxylic acid esters such as maleate; and N-ethyl toluene sulfonamide, triacetin, O-cresyl p-toluenesulfonate and tripropionin. Particularly of them, if a plasticizer such as dioctyl adipate, benzyl adipate-2 butoxyethoxyethyl, tricresyl phosphate, diphenylcresyl phosphate or diphenyl octyl phosphate is added, not only thermoplasticity and breaking elongation but also shock resistance can be effectively improved.

Examples of other plasticizers include cyclohexane dicarboxylic acid esters such as dihexyl cyclohexanedicarboxylate, dioctyl cyclohexanedicarboxylate and di-2-methyloctyl cyclohexanedicarboxylate; trimellitic acid esters such as dihexyl trimellitate, diethylhexyl trimellitate and dioctyl trimellitate; and pyromellitic acid esters such as dihexyl pyromellitate, diethylhexyl pyromellitate and dioctyl pyromellitate.

To the cellulose derivative according to an exemplary embodiment, if necessary, an inorganic or organic granular or fibrous filler can be added. By adding a filler, strength and rigidity can be more improved. Examples of the filler include, mineral particles (talc, mica, baked siliceous earth, kaolin, sericite, bentonite, smectite, clay, silica, quartz powder, glass beads, glass powder, glass flake, milled fiber, Wollastonite, etc.), boron-containing compounds (boron nitride, boron carbonate, titanium boride etc.), metal carbonates (magnesium carbonate, heavy calcium carbonate, light calcium carbonate, etc.), metal silicates (calcium silicate, aluminum silicate, magnesium silicate, magnesium aluminosilicate, etc.), metal oxides (magnesium oxide etc.), metal hydroxides (aluminum hydroxide, calcium hydroxide, magnesium hydroxide, etc.), metal sulfates (calcium sulfate, barium sulfate, etc.), metal carbides (silicon carbide, aluminum carbide, titanium carbide, etc.), metal nitrides (aluminum nitride, silicon nitride, titanium nitride, etc.), white carbon and metal foils. Examples of the fibrous filler include organic fibers (natural fiber, papers etc.), inorganic fibers (glass fiber, asbestos fiber, carbon fiber, silica fiber, silica alumina fiber, Wollastonite, zirconia fiber, potassium titanate fiber etc.) and metal fibers. These fillers can be used singly or in combination of two or more types.

To the cellulose derivative according to an exemplary embodiment, if necessary, a flame retardant can be added. By adding a flame retardant, flame resistance can be imparted. Examples of the flame retardant include metal hydrates such as magnesium hydroxide, aluminum hydroxide and hydrotalcite, basic magnesium carbonate, calcium carbonate, silica, alumina, talc, clay, zeolite, bromine-based flame retardant, antimony trioxide, phosphoric acid based flame retardant (aromatic phosphate, aromatic condensed phosphate, etc.), compounds containing phosphorus and nitrogen (phosphazene compound), etc. These flame retardants can be used singly or in combination with two or more types.

To the cellulose derivative according to an exemplary embodiment, if necessary, a shock resistance improver can be added. By adding a shock resistance improver, shock resistance can be improved. Examples of the shock resistance improver include a rubber component and a silicone compound. Examples of the rubber component include a natural rubber, epoxylated natural rubber and synthesized rubber. Furthermore, examples of the silicone compound include organic polysiloxane formed by polymerization of alkyl siloxane, alkyl phenyl siloxane, etc. and modified silicone compounds obtained by modifying a side chain or an end of an organic polysiloxane as mentioned above with polyether, methylstyryl, alkyl, higher fatty acid ester, alkoxy, fluorine, an amino group, an epoxy group, a carboxyl group, a carbinol group, a methacryl group, a mercapto group, a phenol group etc. These shock resistance improvers can be used singly or in combination of two or more types.

As the silicone compound, a modified silicone compound (modified polysiloxane compound) is preferred. As the modified silicone compound, a modified polydimethyl siloxane is preferred, which has a structure having a main chain constituted of dimethyl siloxane repeat units and a side chain or a terminal methyl group partly substituted with an organic substituent containing at least one group selected from an amino group, an epoxy group, a carbinol group, a phenol group, a mercapto group, a carboxyl group, a methacryl group, a long-chain alkyl group, an aralkyl group, a phenyl group, a phenoxy group, an alkyl phenoxy group, a long-chain fatty acid ester group, a long-chain fatty acid amide group and a polyether group. The modified silicone compound, because of the presence of such an organic substituent, is improved in affinity for the aforementioned cellulose derivative and dispersibility in the cellulose derivative is improved. Consequently, a resin composition excellent in shock resistance can be obtained.

As such a modified silicone compound, a modified silicone compound produced in accordance with a conventional method can be used.

Examples of the organic substituent contained in the modified silicone compound include the organic substituents represented by the following formulas (2) to (20) are mentioned:

[Formula 2]

(2)

(3)

(4)

(5)

(6)

[Formula 4]

(7)

(8)

(9)

(10)

[Formula 5]

(11)

-continued

[Formula 6]

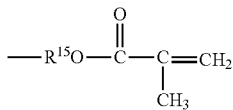
(12)

[Formula 7]

—R$^{16}$
(13)

[Formula 8]

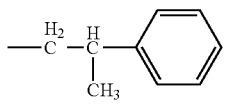
(14)

(15)

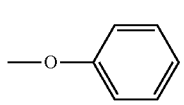
(16)

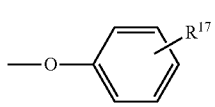
(17)

[Formula 9]

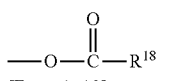
(18)

[Formula 10]

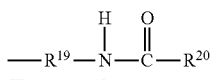
(19)

[Formula 11]

(20)

where a and b each represent an integer of 1 to 50.

In the aforementioned formulas, $R^1$ to $R^{10}$, $R^{12}$ to $R^{15}$, $R^{19}$ and $R^{21}$ each represent a divalent organic group. Examples of the divalent organic group include alkylene groups such as a methylene group, an ethylene group, a propylene group and a butylene group; alkyl arylene groups such as a phenylene group and a tolylene group; oxyalkylene groups and polyoxyalkylene groups such as —(CH$_2$—CH$_2$—O)c- (c represents an integer from 1 to 50), —[CH$_2$—CH(CH$_3$)—O]$_d$— (d represents an integer from 1 to 50), and —(CH$_2$)e-NHCO— (e represents an integer from 1 to 8). Of these, an alkylene group is preferable and particularly, an ethylene group and a propylene group are preferable.

In the aforementioned formulas, $R^{11}$, $R^{16}$ to $R^{18}$, $R^{20}$ and $R^{22}$ each represent an alkyl group having at most 20 carbon atoms. Examples of the alkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group and a pentadecyl group. Furthermore, the structures of the above alkyl groups may have one or more unsaturated bonds.

The total average content of organic substituents in a modified silicone compound desirably falls within the range where the modified silicone compound having an appropriate particle diameter (for example, 0.1 μm or more and 100 μm or less) can be dispersed in a matrix, i.e., a cellulose derivative, during a process for producing a cellulose derivative composition. If a modified silicone compound having an appropriate particle diameter is dispersed in a cellulose derivative, stress concentration on the periphery of a silicone region having a low elastic modulus effectively occurs. As a result, a resin molded body having excellent shock resistance can be obtained. The total average content of such organic substituents is preferably 0.01% by mass or more and more preferably 0.1% by mass or more, and also preferably 70% by mass or less and more preferably 50% by mass or less. If an organic substituent is contained appropriately, the modified silicone compound can be improved in affinity for a cellulose resin, the modified silicone compound having an appropriate particle diameter can be dispersed in a cellulose derivative, and further bleed out due to separation of the modified silicone compound in a molding can be suppressed. If the total average content of the organic substituents is excessively low, it becomes difficult to disperse a modified silicone compound having an appropriate particle diameter in a cardanol-added cellulose resin.

If an organic substituent of the modified polydimethyl siloxane compound is an amino group, an epoxy group, a carbinol group, a phenol group, a mercapto group, a carboxyl group or a methacryl group, the average content of the organic substituent in the modified polydimethyl siloxane compound can be obtained by the following Expression (I).

Organic substituent average content (%)=(organic substituent formula-weight/organic substituent equivalent)×100 (I)

In the Expression (I), the organic substituent equivalent is an average mass of a modified silicone compound per organic substituent (1 mole).

When the organic substituent of the modified polydimethyl siloxane compound is a phenoxy group, an alkylphenoxy group, a long-chain alkyl group, an aralkyl group, a long-chain fatty acid ester group or a long-chain fatty acid amide group, the average content of the organic substituent of the modified polydimethyl siloxane compound can be obtained from the following Expression (II).

Organic substituent average content (%)=x×w/[(1−x)×74+x×(59+w)]×100 (II)

In the Expression (II), x is an average molar fraction of the organic substituent-containing a siloxane repeat unit relative to all siloxane repeat units of the modified polydimethyl siloxane compound; and w is the formula weight of the organic substituent.

In the case where the organic substituent of the modified polydimethyl siloxane compound is a phenyl group, the average content of the phenyl group in the modified polydimethyl siloxane compound can be obtained by the following Expression (III).

Phenyl group average content (%)=154×x/[74×(1−x)+198×x]×100 (III)

In the Expression (III), x is an average molar fraction of the phenyl group-containing siloxane repeat unit relative to all siloxane repeat units in the modified polydimethyl siloxane compound (A).

In the case where the organic substituent of the modified polydimethyl siloxane compound is a polyether group, the average content of the polyether group in the modified polydimethyl siloxane compound can be obtained by the following Expression (IV).

Polyether group average content (%)=HLB value/
20×100    (IV)

In the Expression (IV), the HLB value represents the degree of affinity of a surfactant for water and oil, and is defined by the following Expression (V) based on the Griffin Act.

HLB value=20×(sum of formula weights of hydrophilic moieties/molecular weight)    (V)

To the cellulose derivative of the exemplary embodiment, two or more modified silicone compounds having different affinities to the derivative may be added. In this case, dispersibility of a relative low-affinity modified silicone compound (A1) is improved by a relative high-affinity modified silicone compound (A2) to obtain a cellulose resin composition having even more excellent shock resistance. The total average content of an organic substituent of the relatively low-affinity modified silicone compound (A1) is preferably 0.01% by mass or more and more preferably 0.1% by mass or more and also preferably 15% by mass or less and more preferably 10% by mass or less. The total average content of an organic substituent of the relatively high-affinity modified silicone compound (A2) is preferably 15% by mass or more and more preferably 20% by mass or more and also preferably 90% by mass or less.

The blending ratio (mass ratio) of the modified silicone compound (A1) to the modified silicone compound (A2) can be set to fall within the range of 10/90 to 90/10.

In a modified silicone compound, dimethyl siloxane repeat units and organic substituent-containing siloxane repeat units each of which may be homologously and continuously connected, alternately connected or connected at random. A modified silicone compound may have a branched structure.

The number average molecular weight of a modified silicone compound is preferably 900 or more and more preferably 1000 or more, and also preferably 1000000 or less, more preferably 300000 or less and further preferably 100000 or less. If the molecular weight of a modified silicone compound is sufficiently large, loss by vaporization can be suppressed in kneading with a melted cellulose derivative during a process for producing a cellulose derivative composition. Furthermore, if the molecular weight of a modified silicone compound is appropriate (not excessively large), a uniform molding having good dispersibility can be obtained.

As the number average molecular weight, a value (calibrated by a polystyrene standard sample) obtained by measuring a 0.1% chloroform solution of a sample by GPC can be employed.

The addition amount of such a modified silicone compound is preferably, in view of obtaining sufficient addition effect, 1% by mass or more relative to the total cellulose derivative composition and more preferably 2% by mass or more. In view of sufficiently ensuring properties of a cellulose resin such as strength and suppressing bleed out, the addition amount of a modified silicone compound is preferably 20% by mass or less and more preferably 10% by mass or less.

By adding such a modified silicone compound to a cellulose derivative, the modified silicone compound having an appropriate particle diameter (for example, 0.1 to 100 μm) can be dispersed in the resin and the shock resistance of a resin composition can be improved.

To the cellulose derivative of the exemplary embodiment, if necessary, additives such as a colorant, an antioxidant and a heat stabilizer may be added as long as they are applied to conventional resin compositions.

To the cellulose derivative of the exemplary embodiment, if necessary, a general thermoplastic resin may be added.

As the thermoplastic resin, a polyester can be added and a straight-chain aliphatic polyester can be preferably used. As the straight-chain aliphatic polyester (Y), the following straight-chain aliphatic polyesters (Y1) and (Y2) are preferable, for example, polybutylene succinate, polybutylene succinate adipate and polycaprolactone can be mentioned.

(Y1) Straight-chain aliphatic polyester containing at least one of repeating units represented by the following formula (21) and formula (22)

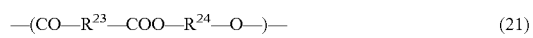    (21)

    (22)

In the formula (21), $R^{23}$ represents a divalent aliphatic group having carbon atoms of 1 to 12, preferably 2 to 8 and more preferably 2 to 4; and $R^{24}$ represents a divalent aliphatic group having carbon atoms of 2 to 12, preferably 2 to 8 and more preferably 2 to 4.

In the formula (22), $R^{25}$ represents a divalent aliphatic group having carbon atoms of 2 to 10, preferably 2 to 8 and more preferably 2 to 4.

(Y2) Straight-chain aliphatic polyester composed of a product obtained by ring-opening polymerization of a cyclic ester.

The straight-chain aliphatic polyester (Y1) can be obtained by a condensation reaction between at least one selected from the group consisting of, for example, an aliphatic dicarboxylic acid, an acid anhydride thereof and a diester thereof, and an aliphatic diol.

The aliphatic dicarboxylic acid has carbon atoms of, for example, 3 to 12, preferably 3 to 9, more preferably 3 to 5. The aliphatic carboxylic acid is, for example, an alkane dicarboxylic acid. Specific examples thereof include malonic acid, succinic acid, adipic acid, sebacic acid, azelaic acid and dodecane dicarboxylic acid. The aliphatic dicarboxylic acids, for example, may be used alone or in combination of two or more.

The aliphatic diol has carbon atoms of, for example, 2 to 12, preferably 2 to 8 and more preferably 2 to 6. The aliphatic diol is, for example, an alkylene glycol. Specific examples thereof include ethylene glycol, 1,3-propylene glycol, 1,4-butane diol, 1,6-hexane diol, 1,9-nonane diol, 1,10-decane diol and 1,12-dodecane diol. Of them, a straight-chain aliphatic diol having 2 to 6 carbon atoms is preferable, and particularly, ethylene glycol, 1,3-propylene glycol, 1,4-butane diol and 1,6-hexane diol are preferable. The aliphatic diols, for example, may be used alone or in combination of two or more.

The straight-chain aliphatic polyester (Y2) is a straight-chain aliphatic polyester obtained by ring-opening polymerization of a cyclic ester. The cyclic ester is, for example, lactone having carbon atoms of 2 to 12. Specific examples thereof include, α-acetolactone, β-propiolactone, γ-butyrolactone and δ-valerolactone. The cyclic esters, for example, may be used alone or in combination with two or more.

The number average molecular weight of the straight-chain aliphatic polyester (Y) is not particularly limited. The lower limit thereof is preferably, for example, 10000 or more, and more preferably 20000 or more. The upper limit thereof is preferably, for example, 200000 or less and more preferably 100000 or less. The aliphatic polyester having a molecular weight within the above range can provide, for example, a more uniform molded body having more excellent dispersibility.

As the number average molecular weight, for example, a value (calibrated by a polystyrene standard sample) obtained by measuring a 0.1% chloroform solution of a sample by GPC can be employed.

By adding a thermoplastic resin having excellent flexibility such as a thermoplastic polyurethane elastomer (TPU) to the cellulose derivative according to an exemplary embodiment, shock resistance can be improved. The addition amount of such a thermoplastic resin (particularly, TPU) is, in view of obtaining sufficient addition effect, preferably 1% by mass or more and more preferably 5% by mass or more relative to the total composition containing the cellulose resin of the exemplary embodiment.

The thermoplastic polyurethane elastomer (TPU) suitable for improving shock resistance that can be used includes a polyurethane elastomer prepared by using a polyol, a diisocyanate and a chain extender.

Examples of the polyol include polyester polyol, polyester ether polyol, polycarbonate polyol and polyether polyol.

Examples of the polyester polyol include a polyester polyol obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.), or an acid ester or an acid anhydride of each of these, and a polyol such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,3-octane diol, 1,9-nonane diol, or a mixture of these; and a polylactone diol obtained by ring-opening polymerization of a lactone monomer such as ε-caprolactone.

Examples of the polyester ether polyol include a compound obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.), or an acid ester or an acid anhydride of each of these, and a glycol such as diethylene glycol or an alkylene oxide adduct (propylene oxide adduct etc.) or a mixture of these.

Examples of the polycarbonate polyol include a polycarbonate polyol obtained by reacting one or two or more polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol and diethylene glycol with diethylene carbonate, dimethyl carbonate, diethyl carbonate, etc.; and further may include a copolymer of a polycaprolactone polyol (PCL) and a polyhexamethylene carbonate (PHL).

Examples of the polyether polyol include a polyethylene glycol, polypropylene glycol and polytetramethylene ether glycol, each of which is obtained by polymerizing respective cyclic ethers: ethylene oxide, propylene oxide and tetrahydrofuran; and copolyethers of these.

Examples of the diisocyanate to be used in formation of TPU include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethyl xylene diisocyanate (TMXDI), 1,6,11-undecane triisocyanate, 1,8-diisocyanatemethyl octane, lysine ester triisocyanate, 1,3,6-hexamethylene triisocyanate, bicycloheptane triisocyanate and dicyclohexyl methane diisocyanate (hydrogenated MDI; HMDI). Of these, 4,4'-diphenylmethane diisocyanate (MDI) and 1,6-hexamethylene diisocyanate (HDI) are preferably used.

Examples of the chain extender to be used in formation of TPU, a low-molecular weight polyol can be used. Examples of the low-molecular weight polyol include aliphatic polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol, diethylene glycol and 1,4-cyclohexane dimethanol and glycerin; and aromatic glycols such as 1,4-dimethylolbenzene, bisphenol A and ethylene oxide or a propylene oxide adduct of bisphenol A.

When a silicone compound is copolymerized with a thermoplastic polyurethane elastomer (TPU) obtained from these materials, further excellent shock resistance can be obtained.

These thermoplastic polyurethane elastomers (TPU) may be used singly or in combination.

A process for producing a resin composition containing the cellulose derivative according to an exemplary embodiment, additives and a thermoplastic resin, is not particularly limited. For example, the resin composition can be produced by melting and mixing additives and the cellulose resin manually by handmixing or by use of a known mixer such as a tumbler mixer, or a ribbon blender, a single-axial or a multiaxial mixing extruder, and a compounding apparatus such as a kneader and kneading roll and, if necessary, granulating the mixture into an appropriate shape. In another preferable process, additives dispersed in solvent such as an organic solvent and a resin are mixed and furthermore, if necessary, a coagulation solvent is added to obtain a mixed composition of the additives and the resin and thereafter, the solvent is evaporated.

The cellulose resin according to the exemplary embodiments mentioned above can be used as a base resin for a molding material (resin composition). The molding material using the cellulose resin as a base resin is suitable for forming a molded body such as housing, e.g. packaging for an electronic device.

The base resin herein refers to a main component of the molding material and means that other components may be contained as long as the components do not prevent the function of the main component. The content rate of the main component is not particularly limited; however, the content rate of the main component in a composition is 50% by mass or more, preferably 70% by mass or more, more preferably 80% by mass or more and particularly preferably 90% by mass or more.

EXAMPLES

Hereinafter, the present invention will be described in more detail with reference to specific examples.

[Measurement of Polymerization of Pulp]

The limiting viscosities [η] of the pulp used for producing the cellulose resins were measured in accordance with the JIS P8215, and the degree of polymerization (DP) of the pulp was calculated according to the equation (VI). The results are given in Table 1. The value of DP shown in Table 1 is the degree of polymerization of the pulp used in the preparation of the cellulose resin of each example and each comparative example.

$$[\eta] = 1.67 \times DP^{0.71} \quad (VI)$$

Example 1

After the activation treatment of cellulose (pulp), the cellulose (pulp) was acylated in a solid-liquid heterogeneous system to obtain a cellulose resin. Specifically, the cellulose resin (cellulose propionate stearate) was prepared according to the following.

Six grams (in terms of dry weight, 37 mmol/glucose unit) of Cellulose 1 (dissolving pulp powder, water content 6.4%, DP560) was put in a reactor and dispersed in 90 ml of pyridine in a nitrogen atmosphere, and stirred overnight at room temperature for activation.

Thereafter, the cellulose dispersion was cooled to 10° C. or less, and 7.85 g (26 mmol) of stearoyl chloride and 10.28 g (111 mmol) of propionyl chloride were mixed in advance and charged into the reactor while maintaining 10° C. or less.

After stirring with heating at 100° C. for 4 hours, the mixture was cooled to 50° C., 125 ml of methanol was added dropwise, and the mixture was stirred for about 30 minutes.

An additional 40 ml of water was added to precipitate the product, which was collected by suction filtration. The resulting solid was washed with 100 ml of methanol (4 times) until the color of the filtrate disappeared.

The washed solid content was dried in vacuo at 105° C. for 5 hours to obtain 13.8 g (yield 97%) of a powdery cellulose resin (cellulose propionate stearate).

The obtained sample (cellulose propionate stearate) was measured by $^1$H-NMR (AV-400, manufactured by Bruker Corporation, 400 MH$_z$, solvent: CDCl$_3$ (partial dissolution)), and as a result, $DS_{Lo}$ was 0.41, and $DS_{Sh}$ was 2.00.

This sample was evaluated according to the following. The results are shown in Table 1.

[Preparation of Injection Molded Body]

A molded body having the following shape was formed from the samples obtained above by using an injection molding machine (HAAKE MiniJet II, manufactured by Thermo Electron Corporation).

Size of the molded body: thickness: 2.4 mm, width: 12.4 mm, length: 80 mm

The molding was performed in the conditions: cylinder temperature of the molding machine: 220° C., temperature of a mold: 60° C., injection pressure: 1200 bar (120 MPa) for 5 seconds and holding pressure: 600 bar (60 MPa) for 20 seconds.

[Measurement of Izod Impact Strength]

The molded bodies obtained above were subjected to measurement of notched Izod impact strength performed in the conditions described in JIS K7110.

The obtained data were evaluated in accordance with the following criteria.

Criteria for evaluation of Izod impact strength:
○: 5.0 kJ/m$^2$ or more
x: less than 5.0 kJ/m$^2$

[Measurement of Flowability (Melt Flow Rate (MFR))]

MFRs were measured using a high-pressure type flow tester (manufactured by Shimadzu Corporation, product name: CFT-500D) at temperatures of 200° C., under a load of 5 kg, a die of 2 mmφ×10 mm (diameter of hole 2 mm, length of hole 10 mm), and preheating of 2 minutes (period from the time when a sample is filled in a cylinder and a piston is inserted to the time when the load is applied), based on JIS7210:1990.

The obtained data were evaluated in accordance with the following criteria.

MFR evaluation criteria
○: 10 g/10 min or more
x: less than 10 g/10 min

Example 2

A cellulose resin (cellulose propionate stearate) was obtained in accordance with the same quantities and method as in Example 1 except that the raw material was changed to cellulose 2 (dissolving pulp powder, water content 6.1%, DP460) (amount of product 13 3 g, yield 96%).

The obtained sample (cellulose propionate stearate) was measured by $^1$H-NMR in the same manner as in Example 1, and as a result, $DS_{Lo}$ was 0.39 and $DS_{Sh}$ was 2.09.

The sample was evaluated for impact strength and flowability in the same manner as in Example 1. The results are shown in Table 1.

Example 3

A cellulose resin (cellulose propionate stearate) was prepared according to the following.

Six grams (in terms of dry weight, 37 mmol/glucose unit) of Cellulose 1 (dissolving pulp powder, water content 6.4%, DP560) was put in a reactor and dispersed in a mixture of 79 ml of N-methylpyrrolidone (NMP) and 11 ml of pyridine in a nitrogen-atmosphere, and stirred overnight at room temperature for activation.

Thereafter, the cellulose dispersion was cooled to 10° C. or less, and 5.60 g (18 mmol) of stearoyl chloride and 10.28 g (111 mmol) of propionyl chloride were mixed in advance and charged into the reactor while maintaining 10° C. or less.

After stirring with heating at 90° C. for 4 hours, the mixture was cooled to 50° C., 90 ml of methanol was added dropwise, and the mixture was stirred for about 30 minutes.

An additional 20 ml of water was added to precipitate the product, which was collected by suction filtration. The resulting solid was washed with 100 ml of methanol (4 times) until the color of the filtrate disappeared.

The washed solid content was dried in vacuo at 105° C. for 5 hours to obtain 12. 6 g (yield 92%) of a powdery cellulose resin (cellulose propionate stearate).

The obtained sample (cellulose propionate stearate) was measured by $^1$H-NMR (AV-400, manufactured by Bruker Corporation, 400 MHz, solvent: CDCl$_3$ (partial dissolution), and as a result, $DS_{Lo}$ was 0.32, and $DS_{Sh}$ was 2.21.

This sample was evaluated for impact strength and flowability in the same manner as in Example 1. The results are shown in Table 1.

Example 4

A cellulose resin (cellulose propionate stearate) was obtained in accordance with the same quantities and method as in Example 3 except that the raw material was changed to cellulose 2 (dissolving pulp powder, water content 6.1%, DP460) (amount of product 12 4 g, yield 89%).

The obtained sample (cellulose propionate stearate) was measured by $^1$H-NMR in the same manner as in Example 1, and as a result, $DS_{Lo}$ was 0.33 and $DS_{Sh}$ was 2.24.

The sample was evaluated for impact strength and flowability in the same manner as in Example 1. The results are shown in Table 1.

Comparative Example 1

A cellulose resin (cellulose propionate stearate) was obtained in accordance with the same quantities and method as in Example 1 except that the raw material was changed to cellulose 3 (dissolving pulp powder, water content 3.5%, DP1090) (amount of product 14 5 g, yield 99%).

The obtained sample (cellulose propionate stearate) was measured by $^1$H-NMR in the same manner as in Example 1, and as a result, $DS_{Lo}$ was 0.44 and $DS_{Sh}$ was 2.05.

The sample was evaluated for impact strength and flowability in the same manner as in Example 1. The results are shown in Table 1.

Comparative Example 2

A cellulose resin (cellulose propionate stearate) was obtained in accordance with the same quantities and method as in Example 1 except that the raw material was changed to cellulose 4 (dissolving pulp powder, water content 6.2%, DP850) (amount of product 14 3 g, yield 99%).

The obtained sample (cellulose propionate stearate) was measured by $^1$H-NMR in the same manner as in Example 1, and as a result, $DS_{Lo}$ was 0.44 and $DS_{Sh}$ was 1.98.

The sample was evaluated for impact strength and flowability in the same manner as in Example 1. The results are shown in Table 1.

Comparative Example 3

A cellulose resin (cellulose propionate stearate) was obtained in accordance with the same quantities and method as in Example 1 except that the raw material was changed to cellulose 5 (dissolving pulp powder, water content 7.3%, DP250) (amount of product 14. 1 g, yield 98%).

The obtained sample (cellulose propionate stearate) was measured by $^1$H-NMR in the same manner as in Example 1, and as a result, $DS_{Lo}$ was 0.39 and $DS_{Sh}$ was 2.07.

The sample was evaluated for impact strength and flowability in the same manner as in Example 1. The results are shown in Table 1.

Comparative Example 4

A cellulose resin (cellulose propionate stearate) was obtained in accordance with the same quantities and method as in Example 3 except that the raw material was changed to cellulose 4 (dissolving pulp powder, water content 6.2%, DP850) (amount of product 12 2 g, yield 91%).

The obtained sample (cellulose propionate stearate) was measured by $^1$H-NMR in the same manner as in Example 1, and as a result, $DS_{Lo}$ was 0.30 and $DS_{Sh}$ was 2.14.

The sample was evaluated for impact strength and flowability in the same manner as in Example 1. The results are shown in Table 1.

Comparative Example 5

A cellulose resin (cellulose propionate stearate) was obtained in accordance with the same quantities and method as in Example 3 except that the raw material was changed to cellulose 5 (dissolving pulp powder, water content 7.3%, DP250) (amount of product 10. 5 g, yield 76%).

The obtained sample (cellulose propionate stearate) was measured by $^1$H-NMR in the same manner as in Example 1, and as a result, $DS_{Lo}$ was 0.33 and $DS_{Sh}$ was 2.19.

The sample was evaluated for impact strength and flowability in the same manner as in Example 1. The results are shown in Table 1.

Table 1 summarizes the long-chain component (octadecanoyl group (corresponding to the acyl group portion contained in stearic acid)), the short-chain component (propionyl group) and degrees of substitution, and evaluation results of impact strength and flowability of each cellulose resin (cellulose propionate stearate) produced.

TABLE 1

| | Pulp | Degree of Polymerization (DP) | Reaction Solvent | Long-chain component ($DS_{Lo}$) | Short-chain component ($DS_{Sh}$) | $DS_{Lo} + DS_{Sh}$ | $DS_{Sh}/DS_{Lo}$ | Impact strength [kJ/m$^2$] | Flowability (MFR) [g/10 min] |
|---|---|---|---|---|---|---|---|---|---|
| Example 1 | Cellulose 1 | 560 | pyridine | 0.41 | 2.00 | 2.41 | 4.9 | 13.3 ○ | 53 ○ |
| Example 2 | Cellulose 2 | 460 | pyridine | 0.39 | 2.09 | 2.48 | 5.4 | 8.2 ○ | 74 ○ |
| Example 3 | Cellulose 1 | 560 | NMP/pyridine | 0.32 | 2.21 | 2.53 | 6.9 | 14.9 ○ | 61 ○ |
| Example 4 | Cellulose 2 | 460 | NMP/pyridine | 0.33 | 2.24 | 2.57 | 6.8 | 9.8 ○ | 145 ○ |
| Comparative Example 1 | Cellulose 3 | 1090 | pyridine | 0.44 | 2.05 | 2.49 | 4.7 | 3.6 x | 0.5 x |
| Comparative Example 2 | Cellulose 4 | 850 | pyridine | 0.44 | 1.98 | 2.42 | 4.5 | 4.4 x | 1.1 x |
| Comparative Example 3 | Cellulose 5 | 250 | pyridine | 0.39 | 2.07 | 2.46 | 5.3 | 3.3 x | 136 ○ |
| Comparative Example 4 | Cellulose 4 | 850 | NMP/pyridine | 0.30 | 2.14 | 2.44 | 7.1 | 6.2 ○ | 7.3 x |
| Comparative Example 5 | Cellulose 5 | 250 | NMP/pyridine | 0.33 | 2.19 | 2.52 | 6.6 | 3.4 x | 330 ○ |

As shown in Table 1, the cellulose resins of the examples according to the exemplary embodiments of the present invention are excellent in mechanical characteristics (impact strength) and thermoplasticity (flowability).

On the other hand, it can be seen that the cellulose resins of the comparative examples produced using pulp (raw material cellulose) having a degree of polymerization not in the range of 300 to 700 are inferior in mechanical characteristics as compared with the cellulose resins of the examples.

Specifically, it can be seen that the cellulose resins of Comparative Examples 1 and 2 using pulp having a degree of polymerization of greater than 700 have high inhomogeneity and poor impact strength, and have insufficient thermoplasticity. In the cellulose resin of Comparative Example 4 using pulp having a degree of polymerization of greater than 700, the impact strength is better than that of the other Comparative Examples, but the impact strength is inferior to that of the Examples, and the thermoplasticity is insufficient. On the contrary, the cellulose resins of Comparative Examples 3 and 5 using pulp having a degree of polymerization of less than 300 are excellent in thermoplasticity but inferior in impact strength.

Having thus described the present invention with reference to the exemplary embodiments and Examples, the present invention is not limited to the above-described exemplary embodiments and Examples. Various modifications understandable to those skilled in the art may be made to the constitution and details of the present invention within the scope thereof.

Some or the whole of the above exemplary embodiments can be described also as the following exemplary embodiments, but is not limited to the following.

Further Exemplary Embodiment 1

A cellulose resin formed by substituting hydrogen atoms of hydroxy groups of a cellulose with a long-chain component being a linear saturated aliphatic acyl group having 14 or more carbon atoms and a short-chain component being an acyl group (propionyl group) having 3 carbon atoms, wherein a degree of substitution with the long-chain component ($DS_{Lo}$) and a degree of substitution with the short-chain component ($DS_{Sh}$) satisfy the following conditional expressions (1) and (2):

$$DS_{Lo}+DS_{Sh} \geq 2.1 \tag{1}$$

$$4 \leq DS_{Sh}/DS_{Lo} \leq 12 \tag{2},$$

Izod impact strength is 5.0 kJ/m² or more, and an MFR (melt flow rate at 200□ and under a load of 5 kg) is 10 g/10 min or more.

Further exemplary embodiment 2

The cellulose resin according to Further exemplary embodiment 1, wherein $DS_{Lo}+DS_{Sh}$ is in the range of 2.1 to 2.6, $DS_{Lo}$ is in the range of 0.3 to 0.5, and $DS_{Sh}$ is in the range of 1.9 to 2.3.

Further Exemplary Embodiment 3

The cellulose resin according to Further exemplary embodiment 2, wherein $DS_{Lo}+DS_{Sh}$ is in the range of 2.25 to 2.6.

Further Exemplary Embodiment 4

The cellulose resin according to Further exemplary embodiment 2 or 3, wherein the $DS_{Sh}$ is in the range 1.9 to 2.2.

Further Exemplary Embodiment 5

The cellulose resin according to any one of Further exemplary embodiments 1 to 4, wherein the polymerization degree of the cellulose is in the range of 300 to 700.

Further Exemplary Embodiment 6

The cellulose resin according to any one of Further exemplary embodiments 1 to 5, wherein the long-chain component is an acyl group moiety of at least one fatty acid selected from myristic acid, palmitic acid, stearic acid, arachidic acid, and behenic acid.

Further Exemplary Embodiment 7

A molding material comprising the cellulose resin according to any one of Further exemplary embodiments 1 to 6.

Further Exemplary Embodiment 8

A molded body formed by using the molding material according to Further exemplary embodiment 7.

Further Exemplary Embodiment 9

A method for producing the cellulose resin according to any one of Further exemplary embodiments 1 to 4, comprising:

acylating hydroxy groups of a cellulose constituting a pulp by reacting the pulp having a polymerization degree of 300 to 700 and dispersed in an organic solvent with propionyl chloride, and a long-chain reactant being an acid chloride of a long-chain fatty acid and comprising the long-chain component, in the presence of the acid trapping component and under warming; and separating an acylated cellulose obtained in the acylating from the organic solvent.

Further Exemplary Embodiment 10

The method for producing the cellulose resin according to Further exemplary embodiment 9, wherein the organic solvent is a solvent providing a liquid holding rate by the cellulose of 90% by volume or more.

Further Exemplary Embodiment 11

The method for producing the cellulose resin according to Further exemplary embodiment 9 or 10, wherein the organic solvent is at least one selected from water, acetic acid, dioxane, pyridine, N-methylpyrrolidone, N,N-dimethylacetamide, N,N-dimethylformamide, and dimethyl sulfoxide.

Further Exemplary Embodiment 12

The method for producing the cellulose resin according to any one of Further exemplary embodiments 9 to 11, wherein the acid trapping component comprises a nitrogen-containing nucleophilic compound.

Further Exemplary Embodiment 13

The method for producing the cellulose resin according to any one of Further exemplary embodiments 9 to 11, wherein a nitrogen-containing nucleophilic compound is used as the acid trapping component and the solvent.

Further Exemplary Embodiment 14

The method for producing the cellulose resin according to any one of Further exemplary embodiments 9 to 13, wherein the acid trapping component comprises triethylamine or pyridine.

Further Exemplary Embodiment 15

The method for producing the cellulose resin according to any one of Further exemplary embodiments 9 to 13, wherein the acid trapping component comprises pyridine.

Further Exemplary Embodiment 16

The method for producing the cellulose resin according to any one of Further exemplary embodiments 9 to 15, wherein the amount of the organic solvent is 10 to 50 times as large as the dry mass of the pulp.

Further Exemplary Embodiment 17

The method for producing a cellulose resin according to any one of Further exemplary embodiments 9 to 16, wherein the acid chloride of the long-chain fatty acid is at least one selected from the acid chloride of myristic acid, the acid chloride of palmitic acid, the acid chloride of stearic acid, the acid chloride of arachidic acid, and the acid chloride of behenic acid.

The invention claimed is:

1. A cellulose resin formed by substituting hydrogen atoms of hydroxy groups of a cellulose with a long-chain component being a linear saturated aliphatic acyl group having 14 or more carbon atoms and a short-chain component being an acyl group (propionyl group) having 3 carbon atoms,
   wherein a degree of substitution with the long-chain component ($DS_{Lo}$) and a degree of substitution with the short-chain component ($DS_{Sh}$) satisfy the following conditional expressions (1) and (2):

$$2.1 \leq DS_{Lo} + DS_{Sh} \leq 2.6 \quad (1),$$

$$4 \leq DS_{Sh}/DS_{Lo} \leq 12 \quad (2),$$

$DS_{Lo}$ is 0.3 or more,
   the linear saturated aliphatic acyl group is introduced in place of a hydrogen atom of a hydroxy group of the cellulose to form an ester bond,
   the propionyl group is introduced in place of a hydrogen atom of a hydroxy group of the cellulose to form an ester bond,
   Izod impact strength is 5.0 kJ/m² or more, and
   an MFR (melt flow rate at 200° C. and under a load of 5 kg) is 10 g/10 min or more.

2. The cellulose resin according to claim 1, wherein $DS_{Lo}$ is in a range of 0.3 to 0.5, and $DS_{Sh}$ is in a range of 1.9 to 2.3.

3. The cellulose resin according to claim 1, wherein the long-chain component is an acyl group moiety of at least one fatty acid selected from myristic acid, palmitic acid, stearic acid, arachidic acid, and behenic acid.

4. The cellulose resin according to claim 1, wherein $DS_{Lo}+DS_{Sh}$ is in a range of 2.1 to 2.6, $DS_{Lo}$ is in a range of 0.3 to 0.5, and $DS_{Sh}$ is in a range of 1.9 to 2.3.

5. The cellulose resin according to claim 4, wherein $DS_{Lo}+DS_{Sh}$ is in the range of 2.25 to 2.6.

6. The cellulose resin according to claim 4, wherein the $DS_{Sh}$ is in the range 1.9 to 2.2.

7. The cellulose resin according to claim 1, wherein the polymerization degree of the cellulose is in the range of 300 to 700.

8. The cellulose resin according to claim 1, wherein the MFR is 50 g/10 min or more.

9. The cellulose resin according to claim 1, wherein $DS_{Lo}$ and $DS_{Sh}$ are obtained by NMR measurement with chloroform solvent.

10. A molding material comprising the cellulose resin according to claim 1.

11. A molded body formed by using the molding material according to claim 10.

12. A method for producing a cellulose resin by substituting hydrogen atoms of hydroxy groups of a cellulose with a long-chain component being a linear saturated aliphatic acyl group having 14 or more carbon atoms and a short-chain component being an acyl group (propionyl group) having 3 carbon atoms,
   wherein, in the cellulose resin
   a degree of substitution with the long-chain component ($DS_{Lo}$) and a degree of substitution with the short-chain component ($DS_{Sh}$) satisfy the following conditional expressions (1) and (2):

$$2.1 \leq DS_{Lo}+DS_{Sh} \leq 2.6 \quad (1),$$

$$4 \leq DS_{Sh}/DS_{Lo} \leq 12 \quad (2),$$

$DS_{Lo}$ is 0.3 or more,
   the linear saturated aliphatic acyl group is introduced in place of a hydrogen atom of a hydroxy group of the cellulose to form an ester bond,
   the propionyl group is introduced in place of a hydrogen atom of a hydroxy group of the cellulose to form an ester bond,
   Izod impact strength is 5.0 kJ/m² or more, and
   an MFR (melt flow rate at 200° C. and under a load of 5 kg) is 10 g/10 min or more; and
   the method comprises:
   acylating hydroxy groups of a cellulose constituting a pulp by reacting
      the pulp having a polymerization degree of 300 to 700 and dispersed in a solvent with
      propionyl chloride, and
      a long-chain reactant being an acid chloride of a long-chain fatty acid and comprising the long-chain component,
      in the presence of the acid trapping component and under warming, thereby forming an acylated cellulose being the cellulose resin formed by substituting hydrogen atoms of hydroxy groups of a cellulose with the long-chain component and the short-chain component; and separating the acylated cellulose obtained in the acylating from the solvent, wherein the solvent is selected from the group consisting of water, acetic acid, dioxane, pyridine, N-methyl pyrrolidone, N,N-dimethyl acetamide, N,N-dimethylformamide and dimethylsulfoxide, and the acid trapping component is selected from the group consisting of an alkaline metal hydroxide, an alkaline earth metal hydroxide, a metal alkoxide, and a nitrogen-containing nucleophilic compound.

13. The method for producing the cellulose resin according to claim 12, wherein the solvent is a solvent providing a liquid holding rate by the cellulose of 90% by volume or more.

14. The method for producing the cellulose resin according to claim 12, wherein the acid trapping component comprises triethylamine or pyridine.

15. The method for producing the cellulose resin according to claim 12, wherein an amount of the solvent is 10 to 50 times as large as the dry mass of the pulp.

16. The method for producing the cellulose resin according to claim 12, wherein the solvent is at least one selected from water, acetic acid, dioxane, pyridine, N-methylpyrrolidone, N,N-dimethylacetamide, N,N-dimethylformamide, and dimethyl sulfoxide.

17. The method for producing the cellulose resin according to claim 12, wherein the acid trapping component comprises a nitrogen-containing nucleophilic compound.

18. The method for producing the cellulose resin according to claim 12, wherein a nitrogen-containing nucleophilic compound is used as the acid trapping component and the solvent.

19. The method for producing the cellulose resin according to claim 12, wherein the acid trapping component comprises pyridine.

20. The method for producing a cellulose resin according to claim 12, wherein the acid chloride of the long-chain fatty acid is at least one selected from the acid chloride of myristic acid, the acid chloride of palmitic acid, the acid chloride of stearic acid, the acid chloride of arachidic acid, and the acid chloride of behenic acid.

21. The method for producing a cellulose resin according to claim 12, wherein an addition amount of the acid trapping component relative to the total amount of the long-chain reactant and the propionyl chloride is 0.1 to 10 equivalents.

22. The method for producing a cellulose resin according to claim 12, wherein the acid trapping component and the solvent are pyridine.

23. The method for producing a cellulose resin according to claim 12, wherein a reaction temperature in the acylating is 50 to 100° C.

24. The method for producing a cellulose resin according to claim 12, wherein $DS_{Lo}+DS_{Sh}$ is in a range of 2.1 to 2.6, and $DS_{Lo}$ is 0.3 or more.

25. The method for producing a cellulose resin according to claim 12, wherein the MFR is 50 g/10 min or more.

26. The method for producing a cellulose resin according to claim 12, wherein $DS_{Lo}$ and $DS_{Sh}$ are obtained by NMR measurement with chloroform solvent.

* * * * *